United States Patent [19]
Kishimoto et al.

[11] 3,715,919
[45] Feb. 13, 1973

[54] METHOD AND APPARATUS FOR MEASURING THE FLOW RATE OF ELECTRICALLY CONDUCTIVE FLUIDS

[75] Inventors: Hiroshi Kishimoto; Kenzo Kobayashi; Yoshiharu Hamazaki; Mituaki Danno, all of Amagasaki, Japan

[73] Assignee: Mitsubishi Denki Kabushiki Kaisha, Chiyoda-ku, Tokyo, Japan

[22] Filed: April 6, 1970

[21] Appl. No.: 25,668

[30] Foreign Application Priority Data

April 7, 1969  Japan ............................... 44/26734
April 7, 1969  Japan ............................... 44/26735

[52] U.S. Cl. ............... 73/194 E, 73/215, 324/34 FL
[51] Int. Cl. ............................................. G01f 13/00
[58] Field of Search ......... 73/194 E, 194 R, 215, 216, 73/227, 290 R; 324/34 FL, 71 NEP; 222/1, 14, 76, 71

[56] References Cited

UNITED STATES PATENTS

| | | | |
|---|---|---|---|
| 3,295,213 | 1/1967 | Hillyar-Russ et al. | 73/228 X |
| 3,366,873 | 1/1968 | Miller et al. | 73/290 X |
| 3,389,601 | 6/1968 | Semplak | 73/194 E X |
| 2,587,631 | 3/1952 | Kuehne | 324/34 |
| 3,269,180 | 8/1966 | Schreiber | 73/215 |
| 3,342,069 | 9/1967 | Brewer | 73/215 |
| 3,396,870 | 8/1968 | Diamond et al. | 73/215 X |

FOREIGN PATENTS OR APPLICATIONS 13,013  12/1965  Japan ............................ 324/34 FL Primary Examiner—Charles A. Ruehl
Attorney—Robert E. Burns and Emmanuel J. Lobato

[57] ABSTRACT

A process and apparatus for measuring the flow rate of electrically conductive fluids comprises flowing an electrically conductive fluid down an inclined passageway and through electromagnetic coils disposed respectively around upstream and downstream portions of the passageway. A change in inductance of each coil due to the electrically conductive fluid is measured to determine the corresponding cross sectional area SA or SB of the fluid at the upstream or downstream locations. Then the flow rate Q is computed from the expression $$Q = \frac{SA \cdot SB}{\sqrt{SA^2 - SB^2}} \sqrt{2gh}$$

where $g$ is the acceleration due to gravity and $h$ is a vertical difference in level between both coils. When the downstream portion has a much higher in flow speed than the upstream portion, $Q = SB \sqrt{2gh}$ is used.

16 Claims, 12 Drawing Figures

PATENTED FEB 13 1973  3,715,919
SHEET 1 OF 4
FIG. 1 (PRIOR ART)
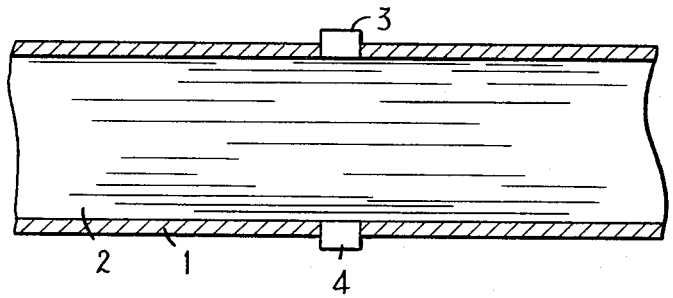
FIG. 2
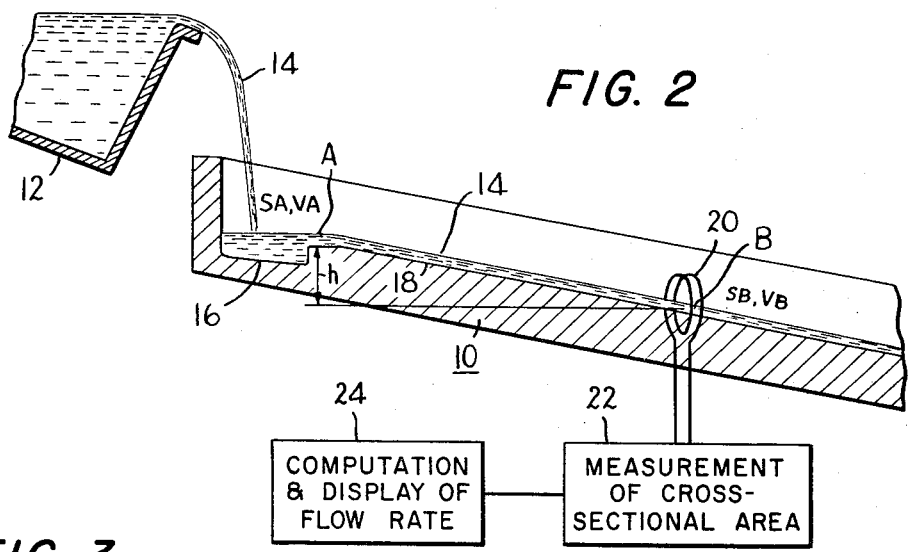
FIG. 3
FIG. 4
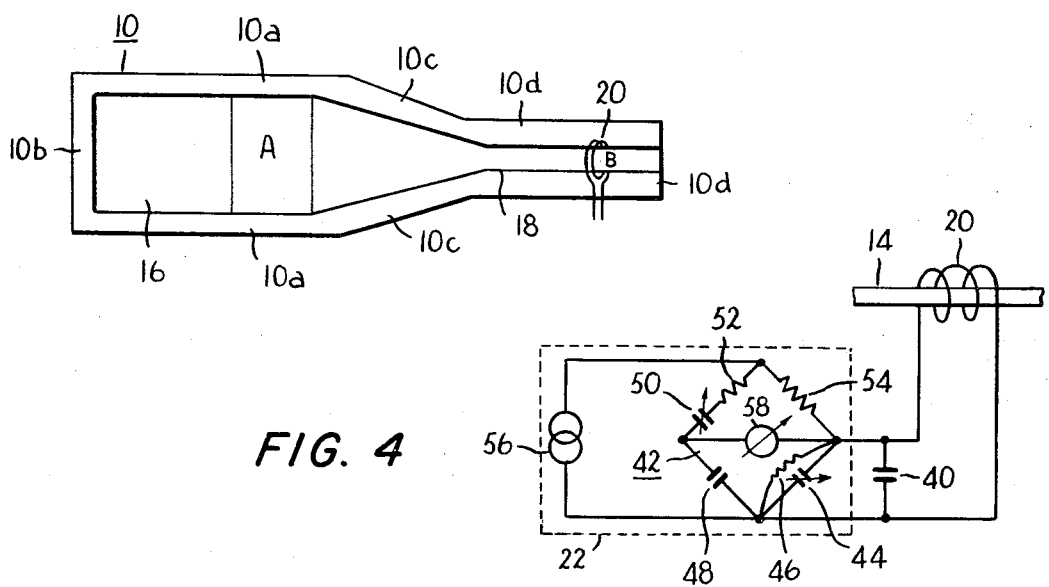

METHOD AND APPARATUS FOR MEASURING THE FLOW RATE OF ELECTRICALLY CONDUCTIVE FLUIDS

BACKGROUND OF THE INVENTION

This invention relates to an apparatus and method for measuring the flow rate of electrically conductive fluids without using a flow passageway having a special configuration and without physically contacting the fluid.

Flow meters of the conventional type have included a measuring probe or probes attached to the internal surface of a length of pipe through which a fluid to be measured flows with the probe directly contacted by the flow of fluid. By using such flow meters, it has been possible to determine the flow rate of the flowing fluid by measuring the speed thereof by the probe or probes provided the cross-sectional area of the flow of fluid is known at the measuring locations. Therefore the conventional flow meters could not determine the flow rate of the fluid unless the cross sectional area of the flow of fluid was known. Also the flow meters have been difficult to be used in measuring the flow rate of hot molten metals or highly corrosive fluids because the measuring probes are in direct contact therewith as above described.

SUMMARY OF THE INVENTION

It is accordingly an object of the invention to eliminate the abovementioned disadvantages of the prior art type flow meters.

It is another object of the invention to provide a new and improved method and apparatus for measuring the flow rate of electrically conductive fluids without directly contacting the flowing fluid.

The invention accomplishes these objects by the provision of a flow meter comprising a trough member having a tilted surface forming part of a flow passageway for a fluid to be measured, measuring means disposed at least downstream of the tilted surface to measure the cross sectional area of the flowing fluid, and means for determining the flow rate of the fluid on the basis of the output from the measuring means.

In order to minimize or substantially eliminate a change in speed of flow at the position of the downstream measuring means resulting from a change in speed of flow on the upstream portion of the tilted trough surface, a head or fall provided by the tilted surface or a vertical difference in level between the upstream end of the tilted surface and the position of the downstream measuring means may be preferably of at least 5 cm.

In order to prevent the head as above described from varying due to a change in position of the downstream measuring means, the tilted trough surface may advantageously have at least the downstream portion horizontally disposed and the measuring means disposed along the horizontal portion.

In order to stabilize the measurement of the cross sectional area of the flow of fluid, the tilted trough surface may have the upstream portion larger in width and converted in streamline form to the downstream portion smaller in width.

BRIEF DESCRIPTION OF THE DRAWINGS

The invention will become more readily apparent from the following detailed description taken in conjunction with the accompanying drawings in which:

FIG. 1 is a fragmental longitudinal sectional view of a flow meter constructed in accordance with the principles of the prior art with parts schematically illustrated at blocks;

FIG. 2 is a longitudinal sectional view of a flow meter constructed in accordance with the principles of the invention with part cut away and with parts illustrated in perspective and at blocks respectively;

FIG. 3 is a plane view of the details of the trough shown in FIG. 2;

FIG. 4 is a schematic circuit diagram of the measuring device shown in FIG. 2;

DESCRIPTION OF THE PREFERRED EMBODIMENT

Figure 5A:
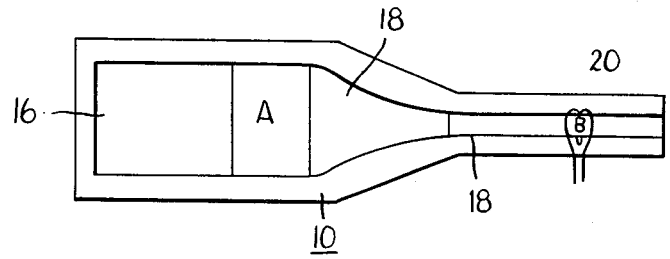
FIG. 5a is a view similar to FIG. 3 but illustrating a modification of the arrangement shown in FIG. 3.

Referring now to FIG. 1 of the drawings, a flow meter of conventional construction is shown including a length of pipe 1 through which a fluid 2 to be measured flows, and a pair of measuring probes 3 and 4 attached in opposite relationship to the internal wall surface of the pipe 1 so as to be contacted by the flowing fluid 2. Only when the flow of fluid 2 and therefore the internal cross section of the pipe 1 has a known cross sectional area can the flow meter be used to measure the speed of flow of the fluid 2 by the measuring probes 3 and 4 in the well known manner to determine the flow rate of the fluid.

Therefore the flow meter illustrated cannot determine the flow rate when the cross sectional area of a flowing fluid is not known. Further it has been difficult to use the flow meter for the measurement of flow rates of hot molten metals and highly corrosive liquid because the measuring probes 3 and 4 need be contacted by the flow of fluid 2.

The invention contemplates to eliminate the abovementioned disadvantages of the prior art type flow meters to thereby provide a new and improved flow meter applicable to any flow of fluid though its cross sectional area would vary whereby it is possible to measure the flow rate of flowing fluid without the necessity of flowing the fluid through a specially designed passageway and without contacting the fluid.

Referring now to FIG. 2 of the drawings there is shown a flow meter constructed in accordance with the principles of the invention to measure flow rate of a molten metal in the process of continuously making steel. The arrangement illustrated comprises a trough generally designated by the reference numeral 10 and illustrated in the plan view of FIG. 3. The trough 10 is disposed at an angle to the horizontal line. In this example the trough 10 has an upstream lefthand end as viewed in FIG. 2 higher in level than the downstream end. A laddle is disposed above the lefthand end of the trough 10 to pour a molten metal 14 into the latter. The molten metal 14 from the laddle 12 falls into a hollow basin or a depression 16 formed on the end portion higher in level of the trough 10 at the bottom and then flows down along a tilted or inclined bottom surface 18 through the trough until it reaches the succeeding processing station (not shown).

Disposed along the flow of molten metal 14 is a measuring element 20 shown in FIG. 2 as being a coil encircling the flow of metal 14 without physically contacting the latter and connected to a measuring device 22 for the purpose of measuring the cross sectional area of the flow 14. The output of the measuring device 22 is connected to a computation and display device 24 where the particular flow rate of the flowing metal 14 is computed and displayed on the basis of the value of the cross sectional area of the flowing metal 14 measured by the measuring element 20 and the device 22.

While the bottom surface 18 is shown in FIG. 2 as being substantially parallel to the bottom of the trough 10, it is to be understood that the same may be disposed at an angle to the horizontal line within the trough 10 while the latter is horizontally disposed. It is essential to form a tilted passageway for the molten metal.

As shown in FIG. 3, the trough 10 includes a pair of opposite parallel side walls 10a having a relatively wide spacing therebetween and an end wall 10b on the lefthand portion thereof as viewed in the same Figure to define the basin 16. The trough further comprises an upstream portion A of the bottom surface 18 having a bottom wall and a pair of opposite side walls 10c connected to the respective walls 10a and gradually decreasing in spacing therebetween toward a downstream portion B of the bottom surface 18. Walls 10c are consecutive respectively to a pair of opposite parallel side walls 10d relatively narrow in spacing therebetween to form the downstream portion B of the bottom surface 18. Thus the bottom surface 18 includes the upstream portion A larger in width and the downstream portion B smaller in width and connected to the upstream portion A through the intermediate tapered portion with the intermediate and downstream portions being tilted. As above described, the downstream portion B has the measuring element 20 disposed thereon so as to encircle a flow of molten metal passing therealong without physically contacting the latter and is opened at the downstream end.

The basin 16 serves to compensate for an abrupt change in the flow of metal from the laddle 12 to provide a stabilized indication of a flow rate. The horizontal upstream portion A serves to stabilize the flow of molten metal along the tilted surface 18 through the trough 10. If desired, the upstream portion A may be tilted to be flush with the intermediate portion.

The fundamental principles of the invention will be described with reference to FIG. 2. It is now assumed that "$h$" represents the vertical elevation between the horizontal upstream portion A and that cross section of the downstream portion B where the measuring element 20 is disposed, or the elevation head provided by the tilted surface 18, and that a flow of fluid, in this case, molten metal 14 has its speeds of flows of VA and VB and its cross sectional areas of SA and SB on the upstream and the said cross section of the downstream portion B respectively. Under the assumed conditions the flow 14 has a flow rate $Q$ on the upstream portion equal to that at the position of the measuring element 20 provided that no hydrodynamic source and sink are present along its flow passageway. Therefore the following relationship is held $$Q = VA \cdot SA = VB \cdot SB \quad (1)$$

Also, if the fluid flowing along the tilted surface 18 has a negligible loss of energy due to the viscous resistance thereof the law of conservation of energy is held for the motion of the fluid to yield the equation $$VA^2 + 2gh = VB^2 \quad (2)$$

where $g$ is the acceleration due to gravity. By eliminating VA and VB from the above equations (1) and (2) the flow rate Q of the fluid is expressed by the equation $$Q = \frac{SA \cdot SB}{\sqrt{SA^2 - SB^2}} \sqrt{2gh} \quad (3)$$

If the speed of flow $VA$ on the upstream portion A is negligibly smaller than the speed of flow $VA$ on the downstream portion B, that is to say, if the inequality $$VA^2 << VB^2 \quad (4)$$

is satisfied, then the upstream portion A is far larger in cross sectional area than the downstream portion B. This can be expressed by $$SA^2 >> SB^2 \quad (5)$$

Therefore the flow rate Q is approximately expressed by the equation $$Q = SB \sqrt{2gh} \quad (6)$$

The above equation (6) describes that the measurement of the cross sectional area SB on the downstream portion B immediately leads to the determination of the corresponding flow rate Q as long as the head $h$ and the acceleration of gravity $g$ are known.

The invention utilizes either of the equations (3) or (6).

In order to utilize the equation (6), the tilted flow passageway of the fluid or molten metal 14 has preferably the configuration as shown in the plan view of FIG. 3 while the head $h$ is of a relatively large value. That is, the upstream portion A is caused to be much larger in width than the downstream portion B.

It is now assumed that the head $h$ has a value of 5 cm and that the speed of flow VA on the upstream portion A is equal to 10 cm/sec. It will be appreciated that the above figures are not particularly large nor small. Since the acceleration due to gravity $g$ is equal to 980 cm/sec$^2$, the speed of flow VB can be calculated from the equation (2). That is $$VB^2 = 10^2 + 2 \times 980 \times 5 \text{ cm/sec.}$$

$$= 9900 \text{ cm/sec.}$$

$$\approx 10^2 \text{ cm/sec.}$$

Thus it will be apparent that under the assumed condition, the relationship (4) is held between the speeds of flow on the upstream and downstream portions A and B respectively and also that a little change in speed of flow on the upstream portion A does not affect the speed of flow on the downstream portion B.

From the foregoing it will be readily understood the the flow passageway should preferably have the configuration as shown in FIG. 3 while at the same time it should be tilted so as to cause a head vertical difference $h$ in level between the upstream end of the tilted passageway and the particular measuring point on the passageway, to be equal to or more than 5 cm.

The cross sectional area of the flow of molten metal 14 can be measured in the manner as will now be described. It is assumed that the coil 20 has an inductance of $L_o$ when no molten metal flows therethrough and an area of $S_o$ encircled thereby and that when the molten metal having its cross sectional area $SB$ flows through the coil 20 the inductance of the latter changes by a quantity $\Delta L$. It has been experimentally verified that the relationship $$SB/S_o = \alpha \Delta L/L_o$$

holds where $\alpha$ is a constant experimentally determined and dependent upon the shape of the coil 20. Since the parameters $S_o$ and $L_o$ are known and the constant $\alpha$ has been preliminarily determined by experimentation, a change in inductance $\Delta L$ can be measured thereby immediately to determine the cross sectional area of the flow of molten metal.

In order to measure a change in inductance of the coil, the measuring device 22 as shown in FIG. 2 may be preferably constructed as shown in FIG. 4. In FIG. 4 the measuring coil 20 is connected across a capacitor 40 to form a tank circuit connected across one arm of an impedance bridge of well known construction generally designated by the reference numeral 42. The bridge 42 includes a parallel combination of a variable capacitor 44 and resistor 46, a capacitor 48, a series combination of variable capacitor 50 and a resistor 52, and a resistor 54 forming four arms thereof respectively. The junction of the parallel combination 44–46 and the capacitor 48 and the junction of the resistors 52 and 54 are connected across an oscillator 56 for generating a frequency of $f_o$ to which the tank circuit 20–40 is resonant which the junction of the parallel combination 44–46 and the resistor 54 and the junction of the capacitors 48 and 50 have connected thereacross a current detector 58.

Before the molten metal 14 flows through the coil 20, the bridge 42 is preset to be balanced for the frequency of $f_o$ in the well known manner. That is, the detector 58 provides a zero indication. Under these circumstances it is assumed that the total capacitance of the capacitors 40 and 44 has a value $C_o$.

When the molten metal 14 flows through the coil 20, its inductance decreases by a value of $\Delta L$ whereby the bridge 42 becomes unbalanced. To revert the bridge to its balanced state for the frequency of $f_o$, it is required to increase the capacitance of the variable capacitor 44 by an increment $\Delta C$ satisfying the relationship $$\Delta C/C_o = \Delta L/L_o$$

Therefore if that incremental capacitance $\Delta C$ is measured by a scale (not shown) operatively associated with the variable capacitor 44, then one can determine the decrement or changed in inductance $\Delta L$ of the inductance of the coil 20 and therefore the corresponding cross sectional area of the molten melt 14 flowing through the coil 20.

Referring back to FIG. 2, an electrical signal representative of the incremental capacitance $\Delta C$ thus measured is introduced into the computation and display device 24 by any suitable means (not shown). The device 24 is operated to use the quantity $\Delta C$ to compute the corresponding flow rate $Q$ of the molten metal in accordance with the equation (6) and to display the result of the computation.

Figure 5B:
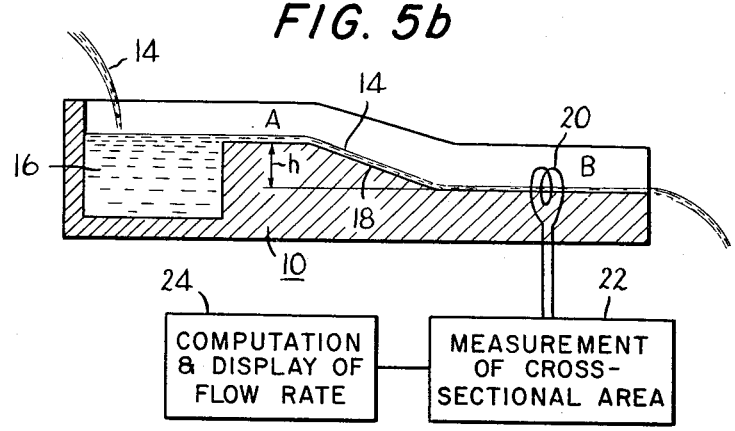
FIG. 5b is a longitudinal sectional view of the device shown in FIG. 5a with parts illustrated in perspective and blocks respectively.

FIG. 5 shows a modification of the arrangement of FIGS. 2 and 3 wherein the downstream portion B is horizontally disposed and has the measuring coil 20 disposed thereon. This measure ensures that even if the measuring coil 20 might vary in position during or after the assembling operation, the head or the vertical difference in level between the upstream and downstream portions A and B remains unchanged and facilitates the design and assembly of the flow meter. Further the tilted portion disposed between both portions A and B of the bottom surface 18 is converged in a streamline manner into the downstream portion B to prevent a measured flow rate from being unstable due to the occurrence of a disturbed flow of molten metal. In other respects the arrangement is identical to that shown in FIGS. 2 and 3 and need not be further described. In FIG. 5 and the following like reference numerals designate the corresponding or identical components.

Figure 6:
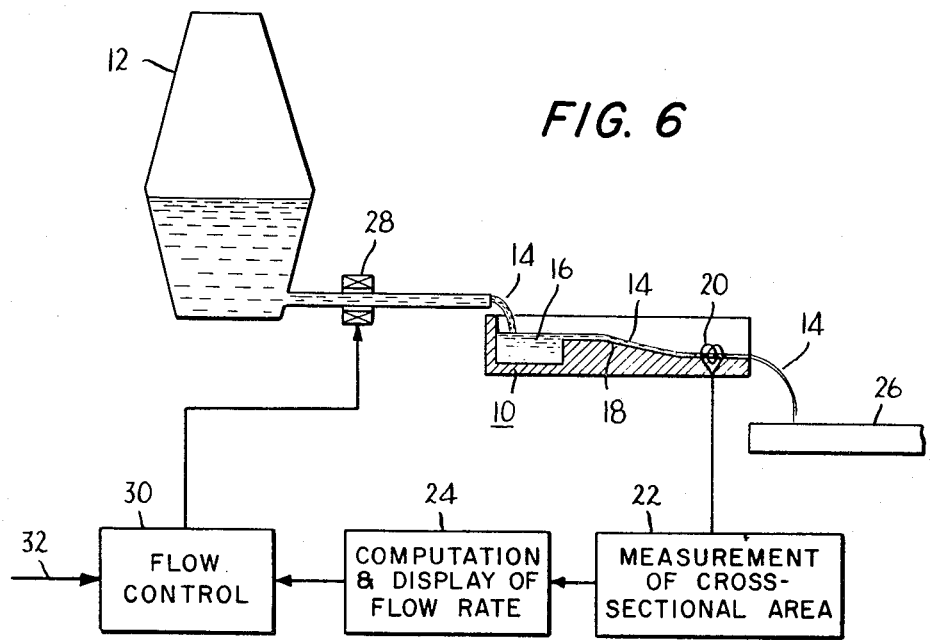
FIG. 6 is a longitudinal sectional view of another modification of the invention with parts illustrated in perspective and at blocks respectively.

FIG. 6 shows one form of the invention applied to the case a molten metal is to be fed into a processing station while the flow rate thereof is maintained at a predetermined magnitude. A source of molten metal 12 such as a blast furnace, a Bessemer converter or a laddle supplies a molten metal such as iron or steel through the arrangement shown in FIG. 3 or 4 to a processing apparatus 26 such as a continuous steelmaking apparatus, a continuous founding apparatus, a degassing apparatus or the like.

A flow regulator 28 of mechanical, electromagnetic or pneumatic type adjusts the flow rate of molten metal 14 from the source 12 to a predetermined magnitude under the control of a flow control 30. Then the flow of metal 14 is supplied to the flow meter 10 of the invention. The actual flow rate determined by the computation device 24 in the manner as previously described is applied to the flow control 30 having also a reference flow rate 32 a supplied thereto. The flow control 30 compares the actual flow rate with the reference flow rate to actuate the flow regulator 28 so as to render an error signal or a difference between both flow rates equal to zero.

Figure 7:
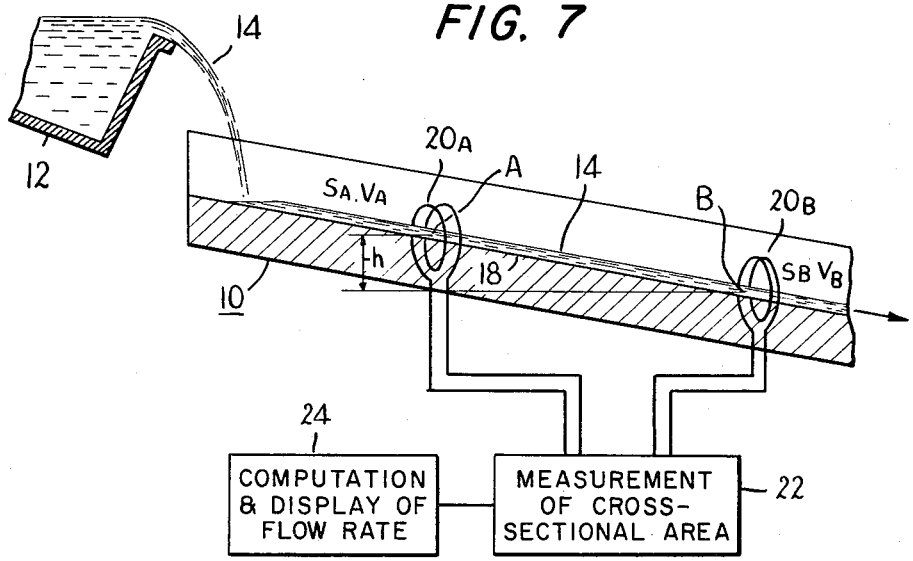
FIG. 7 is a fragmental longitudinal sectional view of still another modification of the invention with parts illustrated in perspective and at blocks respectively.

The invention has been described in conjunction with the arrangements including the upstream portion A negligibly smaller in speed of flow than the downstream portion. If the speed of flow on the upstream portion A is not negligibly smaller than that on the downstream portion B of the flow of molten metal, the equation (3) as previously described is used. To this end, a pair of measuring coils such as the coil 20 are operatively associated with the upstream and downstream portions A and B of the flow of metal respectively as shown in FIG. 7. More specifically, a pair of upstream and downstream coils 20A and B are disposed respectively on the upstream and downstream portion A and B of a tilted flow passage formed of the tilted trough surface 18 in the trough 10 in the manner as previously described in conjunction with FIG. 2. Then both measuring coils 20A and B are connected to the device 22 for measuring the cross sectional areas of the metal flow on the upstream and downstream portions A and B. In the embodiment illustrated the device 22 can include a pair of circuitries for measuring the upstream and downstream cross sectional areas of the flow of molten metal in the manner as previously described in conjunction with FIG. 4. Then a pair of electrical signals representative of both cross sectional areas are supplied to the computation and display device 24 where a computation is effected in accordance with the equation (3) and the result of this computation is displayed. It is noted that the head "$h$" corresponds to a vertical difference in level between those portions of the flow of molten metal on which the measuring coils 20A and B are disposed respectively.

Figure 8:
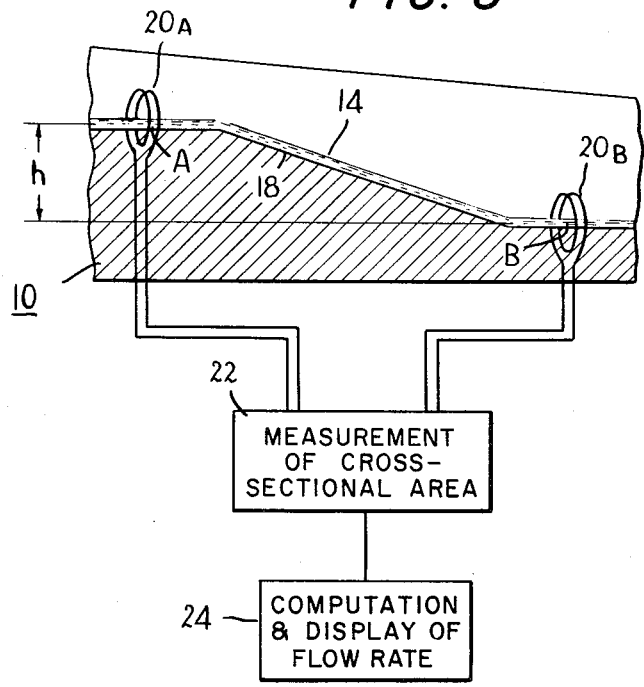
FIG. 8 is a view similar to FIG. 7 but illustrating a modified form of the device shown in FIG. 7.

An arrangement shown in FIG. 8 is similar to that illustrated in FIG. 7 excepting that the measuring coils 20A and B are disposed on the upstream and downstream portions A and B horizontally disposed of the flow passageway. If desired, either one of the upstream and downstream portions A and B may be tilted to be flush with the intermediate flow portion.

Figure 9:
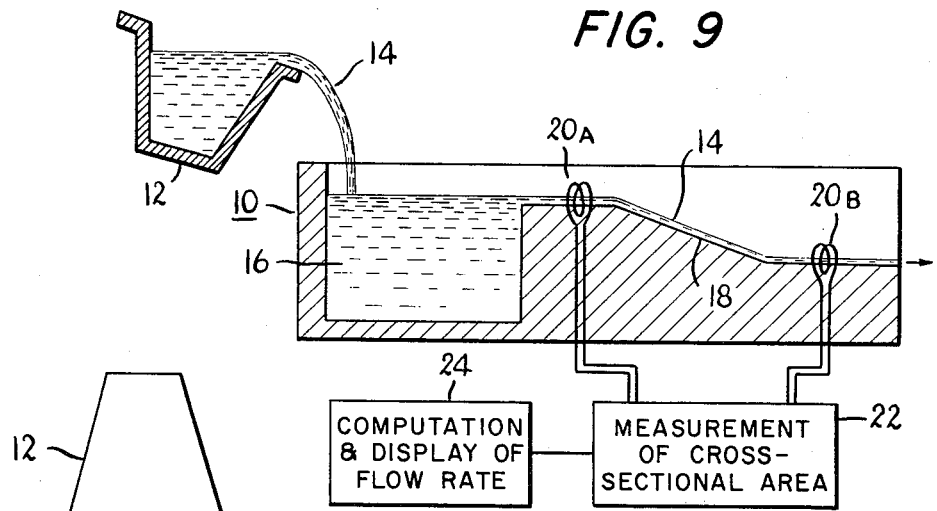
FIG. 9 is a view similar to FIG. 5 but illustrating a modification of the device shown in FIG. 5.

FIG. 9 shows a modification of the arrangement illustrated in FIG. 8 wherein the basin 16 is disposed at the inlet of the flow passageway formed in the trough 10 for the purpose as previously described. In other respects the arrangement is identical to that shown in FIG. 8.

Figure 10:
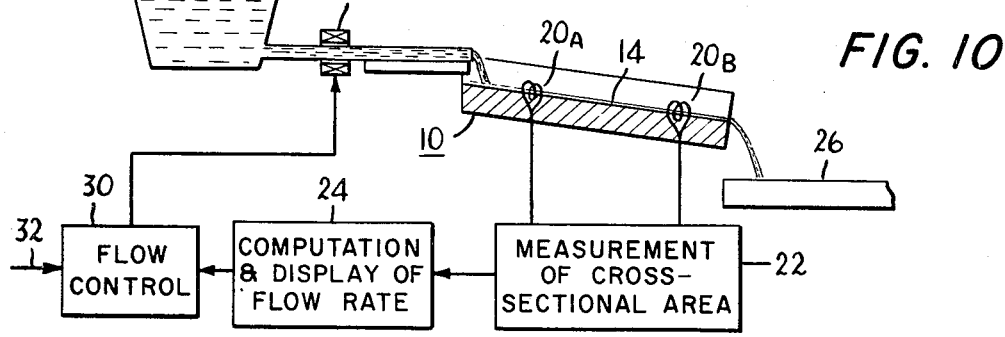
FIG. 10 is a view similar to FIG. 6 but illustrating a modified form of the device shown in FIG. 6.

An arrangement shown in FIG. 10 is substantially identical to that illustrated in FIG. 6. Both arrangements are different from each other only in that in FIG. 10 the arrangement of FIG. 7 is used in place of that shown in FIG. 3 or 4.

Figure 11:
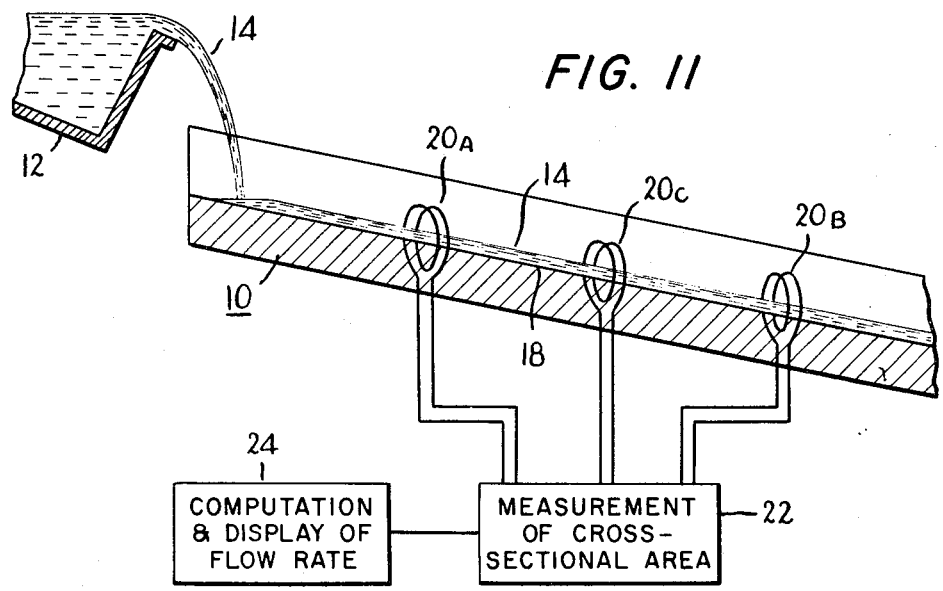
FIG. 11 is a view similar to FIG. 7 but illustrating a modified form of the device shown in FIG. 7.

In order to improve the accuracy of measurement, the flow passageway formed of the tilted bottom surface 18 in the trough can have, in addition to the upstream and downstream coils 20A and B, an intermediate measuring coil 20C disposed between the former coils as shown in FIG. 11. If desired, two or more intermediate coils may be disposed in spaced relationship between the upstream and downstream coils 20A and B. Then the measuring device 22 includes the circuitries such as shown in FIG. 4 equal in the number to the measuring coils.

In summary the invention includes a trough for causing one portion of a passageway for a molten metal to be tilted and means for measuring the cross sectional area on the downstream portion of the tilted flow passages or both cross sectional areas on the upstream and downstream portion thereof thereby to determine the corresponding flow rate or rates. Further the invention eliminates not only the necessity of contacting the measuring element or elements with the flow of molten metal but also the necessity of changing or redesigning the flow passageway. Therefore it is possible to determine the flow rate of the molten metal in the processes of continuously making iron and steel such as continuous iron-spouting, continuous steel-making, continuous founding, etc., or in the processes of refining and founding aluminum, copper, etc. Further the addition of the well known flow control to the present flow meter permits the flow rate of the molten metal to be controlled at will. Therefore the invention permits the processes as above described to be simply operated and greatly serves to improve the quality of the products prepared by those processes.

While the invention has been described in terms of a molten metal, it is to be understood that it is not limited thereto or thereby and that it is equally applicable to electrically conductive fluids other than molten metals.

What we claim is:

1. A flow meter comprising: a trough member including an inclined surface forming a part of a passageway for a fluid to be measured, means defining a fluid reservoir disposed at the upstream end of said inclined surface for delivering the fluid to said inclined surface at an initial speed having a substantially zero value, measuring means disposed downstream of said inclined surface and at a predetermined vertical distance beneath said upstream end of said inclined surface for measuring the cross sectional area of the flowing fluid and providing a corresponding output signal, and means for determining the flow rate of the fluid on the basis of the output signal from said measuring means.

2. A flow meter as claimed in claim 1 wherein said vertical distance is at least 5 cm.

3. A flow meter as claimed in claim 1 wherein said passageway includes a horizontal portion disposed immediately downstream of said inclined surface and has said measuring means disposed thereon.

4. A flow meter as claimed in claim 1 wherein upstream and downstream end portions of said inclined surface are respectively connected to horizontal portions of said passageway and wherein said measuring means is disposed on the downstream horizontal portion.

5. A flow meter as claimed in claim 1 wherein said inclined surface includes an intermediate inclined surface portion disposed between the upstream and downstream portions thereof and converging in a streamline manner into said downstream portion.

6. A flow meter as claimed in claim 1 wherein said means defining a fluid reservoir comprises a hollow basin disposed upstream of said inclined surface.

7. A flow meter as claimed in claim 1 wherein said measuring means includes an electromagnetic coil encircling the flowing fluid and having an inductance property which varies according to the cross sectional area of the flowing fluid.

8. A flow meter comprising: a trough member including an inclined surface forming a part of a passageway for a fluid to be measured, at least two measuring means disposed at positions spaced-apart from each other by a predetermined elevation along said inclined surface for measuring the cross sectional areas of the flowing fluid at said positions and providing respective output signals, and means for determining the flow rate of the flowing fluid on the basis of the output signals from said measuring means.

9. A flow meter as claimed in claim 8 including a hollow basin disposed upstream of said inclined surface.

10. A method for determining the flow rate of a flowing electrically conductive fluid comprising: flowing an electrically conductive fluid from an upstream location past a downstream location along a flow path having an inclined portion of known elevation; electromagnetically deriving an area signal representative of the cross-sectional area of the flowing electrically conductive fluid at said downstream location without physically contacting the fluid; and determining the flow rate of the flowing electrically conductive fluid using said area signal and said known elevation.

11. A method according to claim 10, wherein said step of electromagnetically deriving an area signal comprises encircling the flowing electrically conductive fluid with an electromagnetic coil having a known inductance value, and measuring the change in inductance of said electromagnetic coil created by the electrically conductive fluid flowing therethrough and providing a corresponding area signal.

12. An apparatus for determining the flow rate of an electrically conductive fluid comprising: means defining a flow path including an inclined portion having an upstream end and a downstream end for flowing an electrically conductive fluid whose flow rate is to be determined from said upstream end at an initial speed of essentially zero downwardly past said downstream end during use of the apparatus; measuring means disposed along said flow path at a measuring position located a predetermined vertical distance from said upstream end of said inclined portion for electromagnetically measuring the cross-sectional area of the flowing electrically conductive fluid at said measuring position without physically contacting same and providing a corresponding area signal; and means receptive of said area signal for determining the flow rate of the flowing electrically conductive fluid.

13. An apparatus according to claim 12, wherein said measuring means comprises an electromagnetic coil of known inductance encircling said flow path at said measuring position, and means connected to said electromagnetic coil for measuring the change in inductance of said electromagnetic coil created by the electrically conductive fluid flowing therethrough and providing a corresponding area signal representative of the cross-sectional area of the flowing fluid at said measuring position.

14. An apparatus according to claim 12, wherein said flow path includes a horizontal portion connected to said downstream end of said inclined portion, and wherein said measuring means is disposed along said horizontal portion.

15. An apparatus according to claim 12, wherein the cross-sectional area of said flow path at said upstream end of said inclined portion is substantially larger than the cross-sectional area of said flow path at said downstream end of said inclined portion.

16. An apparatus for determining the flow rate of an electrically conductive fluid comprising: means defining a flow path including an inclined portion for flowing therealong during use of the apparatus an electrically conductive fluid whose flow rate is to be measured; at least two measuring means disposed at measuring positions spaced-apart from each other by a predetermined elevation along said inclined portion of said flow path for electromagnetically measuring the cross-sectional area of the flowing electrically conductive fluid at said measuring positions without physically contacting the fluid and providing corresponding area signals; and means receptive of said area signals for determining the flow rate of the flowing electrically conductive fluid.

* * * * *